Feb. 10, 1953  C. PAGE  2,627,990
EGG-CONTAINER SEPARATING DEVICE
Original Filed Dec. 27, 1946
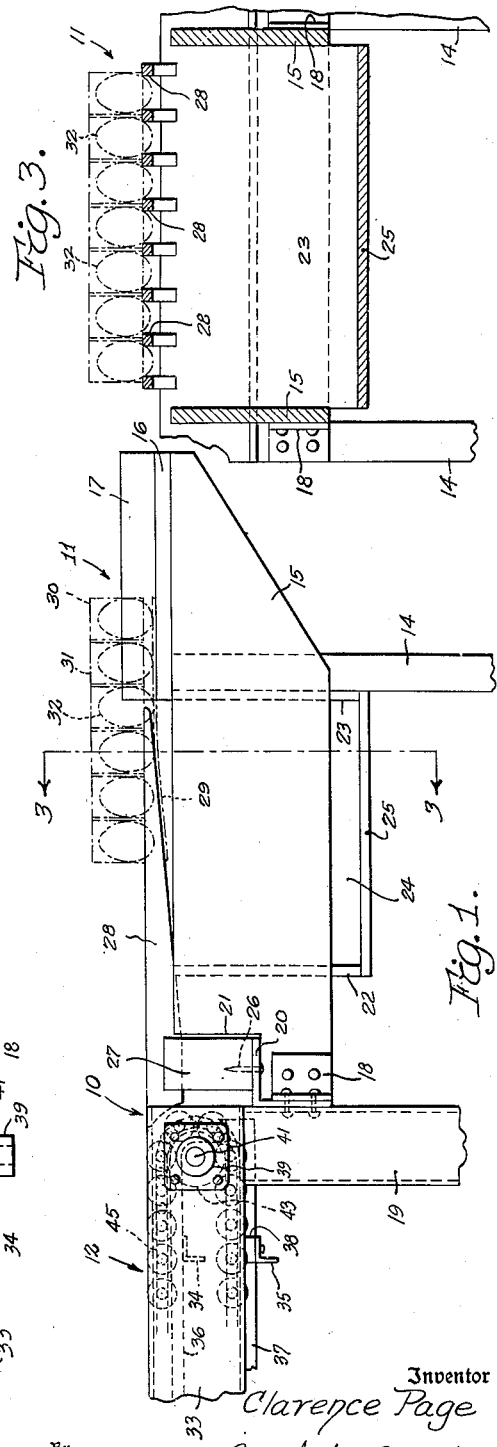
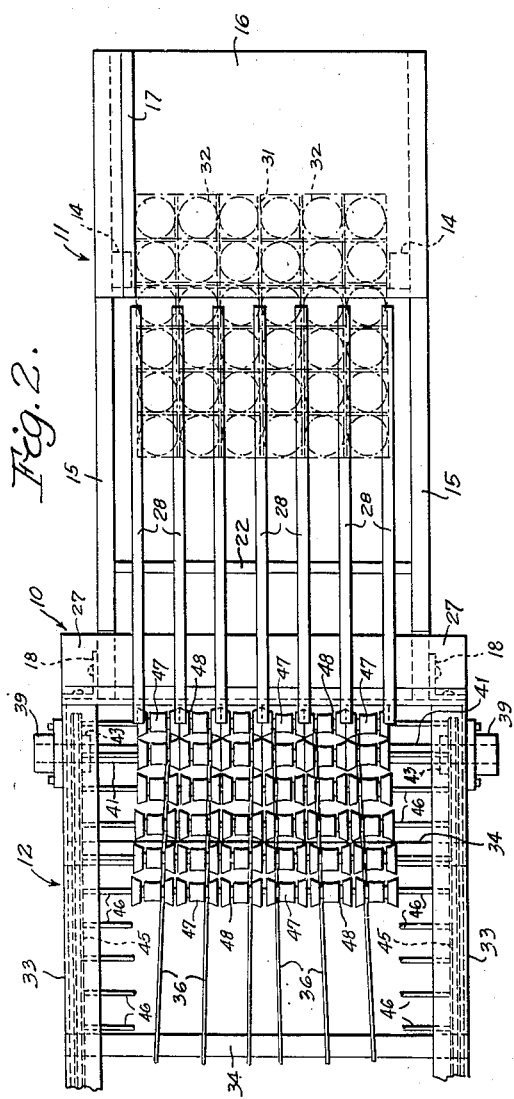
Inventor
Clarence Page
By Barthel + Bugbee
Attorneys Patented Feb. 10, 1953

2,627,990

UNITED STATES PATENT OFFICE 2,627,990

EGG-CONTAINER SEPARATING DEVICE

Clarence Page, Detroit, Mich., assignor to Page and Cox, Detroit, Mich., a corporation of Michigan Original application December 27, 1946, Serial No. 718,755, now Patent No. 2,481,440, dated September 6, 1949. Divided and this application March 20, 1948, Serial No. 16,127

3 Claims. (Cl. 214—300)

This invention relates to egg-handling machinery and, in particular, to machines for removing eggs from their containers.

One object of this invention is to provide a machine for automatically separating eggs from the containers or so-called "fillers" in which they are pocketed and for removing the so-called "flats" or bottoms of the egg-containers which close the bottoms of the fillers.

Another object is to provide a machine for removing the bottoms of egg containers in response to the sliding of the egg-containers along the machine, spaced fingers being provided which are thereby automatically inserted between the so-called "fillers" or upper portions of the egg-containers and the so-called "flats" or bottoms thereof.

This application is a division of my co-pending application Serial No. 718,755 filed December 27, 1946 for Egg-Grading Machine, which issued as Patent No. 2,481,440 on September 6, 1949.

In the drawings:

Figure 1 is a side elevation of a machine for removing eggs from egg-containers, according to a preferred form of the invention, as connected to an egg-orienting machine;

Figure 2 is a top plan view of the machines shown in Figure 1; and

Figure 3 is a vertical section taken along the line 3—3 in Figure 1.

In general, the egg container removing machine of the present invention, generally designated 11, is one unit of a multiple unit egg-grading machine which includes two other units, namely an egg-orienting or separating conveyor unit, generally designated 12, and an egg-sorting unit, not shown herein but disclosed and claimed in my co-pending application referred to above. The egg-separating conveyor unit 12, after the removal of the egg-container, separates the eggs into rows, causes each egg to come to rest with its long axis approximately horizontal, and deposits the eggs upon egg rests. The eggs are then automatically picked up from these egg rests by a conveying device in the egg-sorting unit (not shown) by which they are classified into groups of eggs of different predetermined weight ranges.

Referring to the drawings in detail, Figures 1 to 3 inclusive show the container remover portion 11 of the egg-feeding unit as connected to the egg-separating conveyor portion 12 at its extreme left-hand end (Figures 1 and 2). Its right-hand end is supported on legs 14 which are secured to side plates 15 which in turn carry a platform 16 having a guide rail 17 on one side thereof. Bolted to the side plates 15 (Figure 1) are angle brackets 18, these in turn being bolted to legs 19 which support the right-hand end of the egg-separating conveyor portion 12. Mounted between the angle brackets 18 and the legs 19 and secured by the same bolts is an angle member 20 which passes transversely across the receiving unit 11 and passes through cut-away portions 21 in the side plates 15 thereof. Mounted between the side plates 15 are the front and rear walls 22 and 23 respectively of a receptacle 24 having a bottom wall 25.

Rising from the angle member 20 (Figure 1) and secured thereto as at 26 is an upright support 27 upon which are mounted a series of spaced parallel elongated stripping fingers 28, the pointed ends of which are directed toward the platform 16. The fingers 28 are for the purpose of stripping the bottoms or flats 29 from the fillers or pocketed portions 30 of egg containers 31 containing eggs 32. This is accomplished, as more fully described in connection with the operation of the machine, by placing the container 31 containing the eggs 32 upon the platform 16 (Figures 1 and 2) and pushing it to the left, causing the pointed fingers 28 to penetrate the container 31 at the junction of the flat 29 with the filler 30, splitting the two apart. The flat 29 drops into the receptacle 24 while the eggs 32 are slid over the tops of the fingers 28, which are spaced apart an amount slightly less than the small diameter of an undersized egg. When the filler 30, with its bottom or flat 29 thus removed, has been pushed to the left-hand end of the stripping fingers 28, it passes onward to the egg-separating unit 12. At this point, the filler 30 is lifted by the operator, the eggs 32 remaining upon the egg-separating portion 12 while the filler 30 is discarded.

The egg-separating conveyor portion 12, shown partly at the left-hand ends of Figures 1 and 2, includes a frame formed by a pair of vertical channel members 33 mounted upon the upper ends of the legs 19 and with their channel portions facing one another. The channel members 33 are interconnected at intervals by upper and lower angle members 34 and 35 respectively (Figures 1 and 2) which in turn support upper and lower diverging guide rails 36 and 37 respectively. The lower flanges of the channel members 33 are separated from the lower angle members 35 by spacing members 38 (Figure 1).

Bolted to the channel members 33 at their forward and rearward ends are pairs of aligned bearing bushings 39 (Figures 1 and 2) in which are journaled cross-shafts 41. Within the channels of the channel members 33 the shafts 41 near their opposite ends carry sprockets 43, these sprockets being encircled by endless chains 45.

Mounted between the endless chains 45 at intervals therealong are rods 46 carrying capstan-shaped rollers or spools 47. The spools 47 are freely rotatable on the rods 46 and slidable axially therealong (Figure 2) and are provided with annular grooves 48 near the ends thereof engageable with guide rails 36 and 37.

The channel members 33 at their left-hand ends are provided with egg-rests (not shown) which serve to receive the eggs oriented by the egg-separating unit 12, from which the eggs are carried onward to the egg-weighing portion of the machine, as described in my above-identified co-pending application. The conveyor chains 45 at their left-hand ends encircle sprockets on a driving shaft (not shown) which is driven by any suitable power unit, such as the motor disclosed in the aforesaid co-pending application.

In the operation of the invention, the eggs in their containers are placed upon the platform 16 of the egg-feeding unit 10 (Figures 1 and 2) and slid toward the egg-separating conveyor unit 12. Meanwhile, the upper surfaces of the pointed fingers 28 have been waxed so as to reduce friction to a minimum. As the egg containers 31 are slid forward (Figure 1), the ends of the pointed fingers 28 wedge their way between the fillers 20 and their "flats" or bottoms 29, forcing the latter downward and detaching them so that they fall into the receptacle 24 from which they may be removed at intervals.

The bottomless fillers 30 with their eggs 32 are now moved still further forward until the first row of eggs therein is engaged by the rollers 47 on the conveyor rods 46 of the egg-separating conveyor unit 12, which has been set in motion by the operation of a motor. The rollers or spools 47 as they move forward along the upper part of the conveyor portion 12 are caused to diverge by the diverging guide rails 36 and at the same time they pull the bottomless fillers 30 forward, until all of the eggs are deposited upon the rollers or spools 47, whereupon the filler 30 may be lifted off and discarded. In most instances it is found that the motion of the spools or rollers 47 caused the filler 30 to ride upward out of engagement with the eggs 32 without the necessity of lifting it.

The eggs thus freed from their fillers 30, are moved along by the conveyor rollers or spools 47 and at the same time are shifted from vertical to horizontal positions. The eggs at the end of the run of the conveyor 12 are deposited by the spools or rollers 47 upon the egg rests previously mentioned (not shown) with their long axes horizontal and extending transversely of the machine. This action separates the eggs into spaced rows and places them in positions where they are most conveniently carried to and deposited upon the weighing devices of the egg-sorting unit (not shown).

Thus, by the invention, the eggs are quickly and easily separated from their containers without danger of breakage and without expensive hand operations. The eggs deposited upon the egg rests, after being oriented are then automatically weighed and separated into weight ranges by the mechanism disclosed and claimed in the above-identified co-pending application.

What I claim is:

1. A separating device for removing the bottom of containers containing eggs, comprising a frame having a supporting platform for the egg containers, a plurality of relatively narrow laterally spaced pointed members disposed adjacent said platform and directed longitudinally thereto at the junction between the bottom and the lower edges of the vertical partitions in the upper portion of each container, said members being responsive to the sliding of said containers along said platform for penetrating said containers adjacent the bottoms thereof and separating said bottoms from said upper portions, and a receptacle beneath said members and platform for receiving the detached bottoms of said egg containers.

2. A separating device for removing the bottoms of containers containing eggs, comprising a frame having a supporting platform for the egg containers, a plurality of relatively narrow laterally spaced pointed members disposed adjacent said platform and directed longitudinally thereto at the junction between the bottom and the lower edges of the vertical partitions in the upper portion of each container, said members being responsive to the sliding of said containers along said platform for penetrating said containers adjacent the bottoms thereof and separating said bottoms from said upper portions, and a receptacle beneath said members and platform for receiving the detached bottoms of said egg containers, the pointed ends of said pointed members being arranged adjacent an aperture opening into said receptacle for the passage of said bottoms.

3. A separating device for removing the bottoms of containers containing eggs, comprising a frame having a supporting platform for the egg containers, a plurality of relatively narrow laterally-spaced pointed members disposed adjacent said platform and directed longitudinally thereto at the junction between the bottom and the lower edges of the vertical partitions in the upper portion of each container, said members being responsive to the sliding of said containers for penetrating said containers adjacent the bottoms thereof and separating said bottoms from said upper portions, and a support beneath said members and platform for receiving the detached bottoms of said egg containers.

CLARENCE PAGE.

REFERENCES CITED

The following references are of record in the file of this patent:

UNITED STATES PATENTS

| Number | Name | Date |
|---|---|---|
| 612,375 | Bennett | Oct. 11, 1898 |
| 1,279,563 | Lowell | Sept. 24, 1918 |
| 1,866,809 | Kasser | July 12, 1932 |
| 1,938,947 | Whitmore | Dec. 12, 1933 |
| 2,074,383 | Funk | Mar. 23, 1937 |